United States Patent [19]

Oppermann et al.

[11] Patent Number: 4,723,102
[45] Date of Patent: Feb. 2, 1988

[54] ELECTRIC SETTING DRIVE FOR AN AUTOMOTIVE VEHICLE SPEED CONTROL OR REGULATING SYSTEM

[75] Inventors: Rolf Oppermann, Schwalbach; Andreas Sausner, Frankfurt am Main, both of Fed. Rep. of Germany

[73] Assignee: VDO Adolf Schindling AG, Frankfurt am Main, Fed. Rep. of Germany

[21] Appl. No.: 924,056

[22] Filed: Oct. 28, 1986

[30] Foreign Application Priority Data

Nov. 4, 1985 [DE] Fed. Rep. of Germany ....... 3539058

[51] Int. Cl.⁴ ............................................. F22B 37/22
[52] U.S. Cl. ................................. 318/468; 123/361; 123/333; 251/129.12; 180/335
[58] Field of Search ............... 318/599, 466, 468; 180/335; 251/129.04, 129.11, 129.12, 129.15, 129.16, 129.2, 295, 227, 284; 123/361, 399, 339, 396, 332, 333

[56] References Cited

U.S. PATENT DOCUMENTS

| 4,114,469 | 9/1978 | Stratienko | 251/129.11 X |
| 4,367,805 | 1/1983 | Totani et al. | 123/361 X |
| 4,452,423 | 6/1984 | Beblaui | 251/129.11 X |
| 4,593,881 | 6/1986 | Yoshino | 251/129.11 X |

FOREIGN PATENT DOCUMENTS

| 633073 | 12/1961 | Canada | 180/82.1 |
| 963698 | 7/1964 | United Kingdom | 251/129.11 |
| 0663939 | 5/1979 | U.S.S.R. | 251/129.11 |
| 0151915 | 9/1979 | U.S.S.R. | 251/129.11 |

Primary Examiner—William M. Shoop, Jr.
Assistant Examiner—Patrick C. Keane
Attorney, Agent, or Firm—Martin A. Farber

[57] ABSTRACT

An electric setting drive for an automotive vehicle speed control or regulating system has an electric motor (1), a gearing (2) which is connected to said motor, and has an electromagnetic rapid-disconnect coupling as well as elements for converting a rotation of the gearing into a linear motion. The linear motion can be transmitted via a pull cable to a spring-loaded throttle valve. For the conversion of the rotary movement into linear movement there is provided a threaded spindle (3) which is turnably connected with the gearing (2) and engages into a thread of a displaceably mounted electrically energizable pot magnet (4). Facing the pot magnet (4) there is a linearly movable armature plate (6) to which the pull cable (7) is attached.

6 Claims, 2 Drawing Figures

ELECTRIC SETTING DRIVE FOR AN AUTOMOTIVE VEHICLE SPEED CONTROL OR REGULATING SYSTEM

FIELD AND BACKGROUND OF THE INVENTION

The present invention relates to an electric setting drive for an automotive vehicle speed control or regulating system having an electric motor, a gearing connected to the motor, an electromagnetic rapid-disconnect coupling, and elements for transforming a rotation of the gearing into a linear motion which can be transmitted via a pull cable to a spring-loaded throttle valve.

Such known setting drives are used for an automotive vehicle speed regulation in which the automotive vehicle maintains a preselected speed by automatic displacement of a throttle valve, or for an automotive vehicle speed control in which control of the speed of the automotive vehicle takes place as a function of the position of the gas pedal.

A known electric setting drive has a DC motor employed as an electromotive drive which converts signals produced by an electronic controller into a mechanical movement, a clock duty ratio of the signals being modulated. In order to actuate a throttle valve or gas rod, the electric motor is connected to a driven member of a setting member via a gearing and an electromagnetic rapid-disconnect coupling. The driven drive of the setting member consists essentially of a driven gear which converts a rotation into a linear movement which can be transmitted via a pull cable to the gas rod for the displacement of a throttle valve. The throttle valve is at all times acted on by a spring which, for reasons of safety, urges the throttle valve into the idling position. The opening of the throttle valve by the setting drive must therefore take place in opposition to external resetting forces which can influence the position of the setting drive. For this reason, in the known setting drives, a relatively expensive feedback is necessary which produces a position report signal which corresponds to the position of the setting drive and is compared in a position regulator with an output signal of a speed regulator or of a speed control and, via a motor drive stage, controls the motor of the setting drive until the latter assumes the position orderd by the speed regulator or the speed control. The rapid-disconnect coupling serves the purpose of maintaining a force lock between a motor of the setting drive and the gas rod in the normal control or regulating operation, and of rapidly disconnecting the motor if the vehicle brake or clutch is actuated with a corresponding signal being given off by the brakelight or clutch switch. The throttle valve is then moved back into the idle position by the spring which acts on it. In the known electric setting drive, a coupling element of the electromagnet rapid-disconnect coupling is a pinion of a gearing which can be swung transverse of its longitudinal axis by means of a hinged armature and an electromagnet. If, while the vehicle is under way, the throttle valve is to be actuated by the speed regulator or speed control, the hinged armature of the electromagnet swings the pinion into engagement while a spur gear of the gearing. In order to disconnect this rapid-disconnect coupling upon interruption of the current through the electromagnet, the pinion is pulled out of engagement with the spur gear by a return spring. This electric setting drive therefore also presents the disadvantage of wear of the spur gear and/or the pinion which wear necessarily takes place as a result of the coupling processes.

SUMMARY OF THE INVENTION

The object of the present invention is therefore so to develop an electric setting drive of the aforementioned type that a rapid-disconnect coupling experiences little wear while operating reliably, and that a linear movement of a driven element of the setting drive is always proportional, under the action of different external forces, to an electric signal by which the electric motor is driven, so that an expensive position feedback with potentiometer and position regulator can be dispensed with.

This object is achieved by use of a self-locking engagement of a threaded spindle, rotatably connected with the gearing, with a displaceably mounted element. The result is obtained that an electric motor of sufficient strength can overcome the external resetting forces which act via a pull cable on the setting drive to insure that the displacement of the displaceable element is in all cases proportional to the electric signal with which the motor is fed. In particular, the setting path of the displaceably mounted element and thus of the pull cable, as well as of the throttle valve, can be independent of pulse-length modulated signals which are proportional to the active resetting forces and are produced by a speed regulator or speed control. A pot magnet serves as the displaceably mounted element into which the threaded spindle is engaged, is energized by current. A linearly movable armature plate is reliably attracted by the magnet and is carried along upon displacement of the displaceable element, no relative movement taking place between the armature plate and the displaceable element or pot magnet. Upon an interruption of the current through the pot magnet, the armature plate is withdrawn from the facing surface of the pot magnet by the action of the pull cable or spring-loading of the throttle valve. Thus there can be practically no wear of the surface of the pot magnet and armature plate which come into operative contact with each other. This is true even if, during the course of a starting and return control, the displaceably mounted element or pot magnet is moved up to force lock with the armature plate against the latter so as to be able then to carry the armature plate along with an oppositely directed movement. Movement of the armature plate corresponds to the desired position of the gas pedal.

In order that the armature plate assumes a well-defined end position in which it can reliably enter into functional connection with the pot magnet due to the starting and return control, the side of the armature plate facing away from the pot magnet is preferalby made conical. This conical side, in combination with a corresponding conical recess in a housing, automatically centers the armature plate when the latter is pulled into the recess by the return spring via the pull cable. The side which enters into operative relationship with the pot magnet is in this case still outside the housing. By constructing the housing with an inserted sleeve, and constructing a cylindrical part of the armature plate to extend from the conically shaped side for the attachment of the cable pull, the result is obtained that the armature plate can be dependably shifted linearly over the displacement path without requiring precise alignment of the sleeve with respect to the threaded spindle.

A disk of non-magnetic material is provided on the side of the armature plate facing the pot magnet, which disk can be placed alternatively on the surface of the pot magnet facing the armature plate, to provide a reliable, rapid disconnecting of the electromagnetic rapid-disconnect coupling upon interruption of the current.

A limit switch is located in the path of movement of the pot magnet in order to disconnect a drive of the pot magnet in the end regions of the setting path of the pot magnet. This prevents the development of force axially on the housing walls and reduces a range of action on the threaded spindle and a thread of the pot magnet.

BRIEF DESCRIPTION OF THE DRAWINGS

The invention will be explained below with reference to the two figures of the accompanying drawing in which.

DETAILED DESCRIPTION OF THE PREFERRED EMBODIMENT

Figure 1:
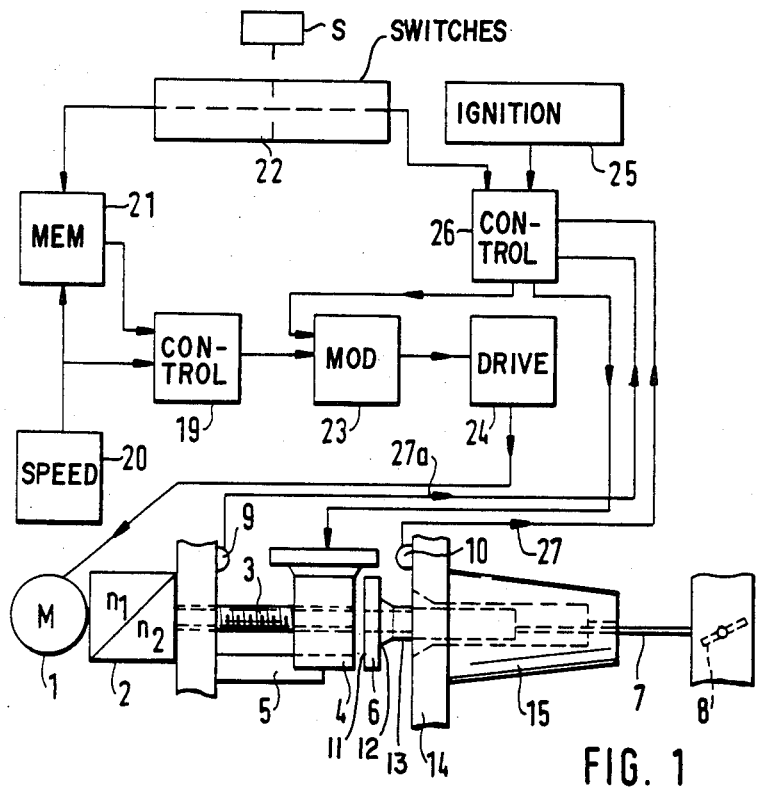
FIG. 1 diagrammatically shows the electric setting drive together with the most important blocks of the speed control system.

Referring to FIG. 1, the electric setting drive comprises an electric motor 1 which is connected to the drive side of a two-stage gearing 2. On its driven side, a threaded spindle 3 is connected with the gearing, the spindle engaging into a thread of a displaceable pot magnet 4. The pot magnet 4 is secured against turning by a guide element 5. An armature plate 6 can be brought into operative relationship, i.e. into force-locked connection, with the pot magnet 4 when the pot magnet 4 is energized and is moved towards the armature plate 6. The armature plate 6 is thus also movable in translation by the pot magnet 4. A pull cable 7 is connected to the pot magnet 4, and is extended to a gas rod or throttle valve 8 of an internal combustion engine, not shown.

Within the path of movement of the pot magnet 4, limit switches 9 and 10 are arranged on a housing, by which switches a displacement of the pot magnet 4 in the corresponding end regions can be controlled.

Figure 2:
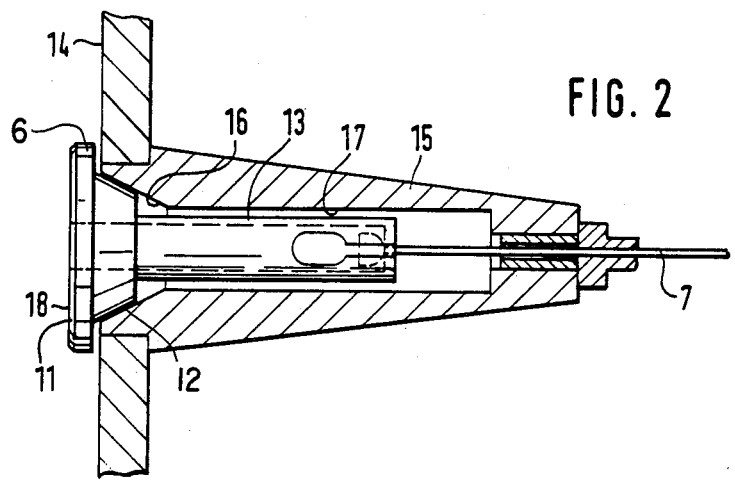
FIG. 2 shows details of the armature plate and of a housing part having a sleeve.

Details of the armature plate 6 and of the corresponding part of the housing can be noted from FIG. 2. The armature plate is flat on its front side 11 facing the pot magnet 4 while its rear side 12 facing away from said magnet 4 has the shape of an outwardly pointing cone. Along the extension of the cone of the rearside 12, a cylindrical part 13 extends from the rear of the armature plate 6 and one end of the pull cable 7 can be attached to said cylindrical part 13. Upon a housing wall 14 there is supported a conical sleeve 15 which has a conical recess 16 at one end, within which recess 16 the conically shaped rear side 12 of the armature plate 6 can be centered. Along an extension of this conical recess 16 and adjoining it, the sleeve 15 has a cylindrical bore 17 which has a diameter which is sufficiently large so that the cylindrical part 13 of the armature plate 6 is loosely movable therein.

In FIG. 2 there can furthermore be noted a disk 18 which is located on the front side 11 of the armature plate 6 and consists of non-magnetic material so that even when the pot magnet 4 lies against it, rapid disconnection of the armature plate 6 can take place when the energizing of the pot magnet 4 is interrupted.

From the diagram of FIG. 1 it can be noted how the setting drive can be connected to an electronic speed regulator. The speed regulator comprises a P-controller 19 (proportional control) with an actual-value input which is provided by a speed transmitter 20, and with a desired-value input which is provided by the output of a digital memory 21. A desired speed value can be stored in the memory 21 by actuating a button S of an operating switch 22. The output of the P-controller 19 leads, via a pulse-length modulator 23 and a motor drive stage 24 in which power amplification of the pulse-length modulated signals takes place, to the motor 1 of the setting drive.

The motor 1 can thus be turned by the pulse-length modulated electric signal which is given off by the motor drive stage 24 so as—in a manner to be described further below—to effect a displacement of the throttle valve 8 which is necessary in order to maintain the speed of the vehicle equal to the desired speed value in the digital memory 21.

Upon the starting of the internal combustion engine of the automotive vehicle, the armature plate 6, is however, initially disconnected from the pot magnet 4 of the rapid-disconnect coupling, and the armature plate 6 lies centered, with its conical rear side 12 in the conical recess 16 since the plate 6 is pulled back by the pull cable 7 under the action of the spring-loaded throttle valve. Upon actuation of the ignition switch, indicated diagrammatically at 25, a signal is first of all produced via a starting and return control 26 and the pulse length modulator 23, by which signal the pot magnet 4 is moved rapidly into an end position in which an operative relationship with the armature plate 6 can be produced by the magnetic flux. This operative relationship is produced upon excitation of the pot magnet 4 under circumstances which depend on a further condition, for instance the exceeding of a given speed of the vehicle. The movement of the pot magnet 4 into the idling end position is braked when a part of the pot magnet 4 comes against the limit switch 10, as a result of which a limit signal is produced on a line 27 to the control 26. In the event of the opposite displacement of the pot magnet 4, the limit switch 9 can produce the stopping of a motor 10 in similar manner over a line 27a. If the pot magnet 4 is brought into active position with respect to the armature plate 6, as previously described, the setting drive is in position ready for operation to pull the pull cable 7 by an amount corresponding to the desired speed or to the deviation of the speed from the desired speed. The pulling of the cable 7 is accomplished by force lock of the motor via the gearing 2, the pot magnet 4 and the armature plate 6.

Upon braking or—in the event that a gear shift is present—upon actuation of a clutch, a brake switch or a clutch switch (not shown) is actuated which interrupts the current through the pot magnet 4. Regardless of the position of the pot magnet, the armature plate is then immediately pulled under the spring loading of the pull cable 7 into the idle position in which it rests in the conical recess 16 of the sleeve 15. In order that the setting device be again ready to operate for the actuating of the throttle valve 8, the pot magnet 4, again controlled by the starting and return control 26, is brought against the front side 11 of the armature plate until a force-locked connection can be produced. For this, there preferably takes place a continuous flow of current through the motor 1 until the limit switch 10 reports that the desired end position has been reached by the pot magnet 4.

With regard to the operating switches 22, mention may also be made of a resumption switch WA, upon the actuating of which the last speed traveled before braking or clutching is automatically again restored.

Before this, the pot magnet 4 must be brought by the starting and return control into the active "fetch" control of the armature plate 6.

Actuation of an operating switch OFF causes the pot magnet 4 together with the armature plate 6 to be moved by electric motor gently into the idling position.

The electric setting drive, as has been shown on a basis of operating conditions of the automatic vehicle indicated by way of example, is adapted to satisfy in reliable operating manner those requirements which ordinarily occur in vehicle speed regulating or control systems.

I claim:

1. In an electric setting drive for an automotive vehicle speed control or regulating system which comprises an electric motor, gearing connected to the motor, an electromagnetic rapid-disconnect coupling, and means for transforming a rotation of the gearing into a linear motion which can be transmitted via a pull cable to a spring-loaded throttle valve; the improvement wherein:
   said transforming means includes:
   a displaceably mounted element having a thread
   a threaded spindle which is turnably connected to the gearing and engages in self-locking manner into the thread of said displaceably mounted element; and wherein;
   the displaceably mounted element is an electrically energizable pot magnet, there being a linearly movable armature plate facing said pot magnet, said pull cable being fastened to said armature plate.

2. The electric setting drive according to claim 1 wherein
   a disk of non-magnetic material is disposed on the side of said armature plate which faces said pot magnet.

3. The electric setting drive according to claim 1, further comprising
   at least one limit switch for connection to a starting and return control of the electric motor, said limit switch being located along a path of movement of the pot magnet.

4. The electric setting drive according to claim 1, further comprising:
   a housing having a conical recess; and wherein;
   said armature plate has a conically shaped side which faces away from said pot magnet and is centerable, in one end positon of the armature plate, within the conical recess in said housing.

5. The electric setting drive according to claim 4, wherein:
   within a sleeve contained in said housing there is formed the conical recess, and along an extension of the recess, adjoining it, there is formed a cylindrical bore; and wherein;
   said armature plate includes a cylindrical part which extends within the cylindrical bore from the conically shaped side of said armature plate for attachment of the pull cable, said cylindrical part being freely displaceable.

6. The electromotive setting drive according to claim 4, further comprising:
   at least one limit switch for connection to a starting and return control of the electric motor, said limit switch being located along a path of movement of the pot magnet.

* * * * *